(12) United States Patent
McCoy, II

(10) Patent No.: US 11,237,379 B2
(45) Date of Patent: Feb. 1, 2022

(54) LEVER ASSEMBLY FOR OPTICAL SCOPES

(71) Applicant: FLATLINE OPS, INC., Bellingham, WA (US)

(72) Inventor: Charles A. McCoy, II, New Meadows, ID (US)

(73) Assignee: FLATLINE OPS, INC., Bellingham, WA (US)

( * ) Notice: Subject to any disclaimer, the term of this patent is extended or adjusted under 35 U.S.C. 154(b) by 0 days.

(21) Appl. No.: 17/156,944

(22) Filed: Jan. 25, 2021

(65) Prior Publication Data

US 2021/0311296 A1 Oct. 7, 2021

Related U.S. Application Data

(60) Provisional application No. 62/967,460, filed on Jan. 29, 2020.

(51) Int. Cl.
*G02B 23/00* (2006.01)
*G02B 23/16* (2006.01)
*F41G 1/38* (2006.01)

(52) U.S. Cl.
CPC .............. *G02B 23/16* (2013.01); *F41G 1/38* (2013.01)

(58) Field of Classification Search
None
See application file for complete search history.

(56) References Cited

U.S. PATENT DOCUMENTS

| | | | | |
|---|---|---|---|---|
| 2,663,083 | A | * 12/1953 | Harms | ................ F41G 11/001 42/126 |
| 2,743,525 | A | * 5/1956 | Leupold | ............... F41G 11/005 42/126 |
| 4,216,600 | A | * 8/1980 | Brueckner | ............ F41G 11/001 42/127 |
| 4,562,658 | A | * 1/1986 | Govett | ................ F41G 11/001 42/125 |
| 9,574,852 | B1 | * 2/2017 | McKillips | ............ F41G 11/003 |
| 2006/0179702 | A1 | * 8/2006 | York | ........................ F41G 1/38 42/122 |
| 2021/0025676 | A1 | * 1/2021 | Reis Green | .......... F41G 11/001 |

* cited by examiner

*Primary Examiner* — Steven M Marsh
(74) *Attorney, Agent, or Firm* — Eric B. Fugett; Mark A. Pitchford; Pitchford Fugett, PLLC

(57) ABSTRACT

A lever assembly for an optical scope defining a mounting surface, a mounting hole, and indicia, the lever assembly comprising a lever member and a mounting member. The lever member comprises a base portion comprising a base wall defining an engaging surface adapted to engage the mounting surface and an extension portion comprising at least one extension side wall extending from the base wall such that a lever sightline is defined by the base wall and the at least one extension side wall. The mounting member is adapted to secure the base wall to the mounting surface by engaging the mounting hole. The mounting member secures the lever member to the optical scope such that the indicia can be viewed along the lever sightline while the lever member is displaced through a range of movement to adjust the optical scope.

20 Claims, 4 Drawing Sheets

LEVER ASSEMBLY FOR OPTICAL SCOPES

CROSS-REFERENCES TO RELATED APPLICATIONS

This non-provisional patent application claims priority to U.S. Provisional Patent Application Ser. No. 62/967,460, filed Jan. 29, 2020 and titled "LEVER ASSEMBLY FOR OPTICAL SCOPES," the entire disclosure of which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

BACKGROUND OF THE INVENTION

The present invention relates generally to the field of optical scopes, and more particularly, to throw levers for optical scopes for firearms.

Optical scopes are often attached to or used in connection with firearms to facilitate aiming of a projectile. The term "rifle scope" will be used herein to refer to an optical scope adapted to be connected to a firearm such as a rifle. Modern rifle scopes typically allow adjustment for one or more of magnification, windage, elevation, and parallax. Magnification is usually controlled by a rotatable magnification adjustment ring or "power ring" located proximate to an eye bell at the rear of a rifle scope, whereas each of windage, elevation, and parallax are usually controlled by a corresponding rotatable adjustment knob or "turret" located forward of the magnification ring in the middle of the rifle scope.

The use of a throw lever to facilitate adjustment of the magnification ring of a rifle scope is known. Currently available throw levers typically include a small arm or other protrusion extending from an annular split collar which clamps around the magnification ring using one or more screws. However, such collars can slip off of the magnification ring when bumped during use, while the throw lever arm can obstruct a user's view of the windage, elevation, and parallax turrets, as well as any attached bubble level or similar accessory, all of which can seriously impede scope adjustment, aiming, and subsequent delivery of accurate fire.

Accordingly, what is needed are improvements in throw levers and methods for facilitating the adjustment of optical scopes for firearms.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Features of the presently disclosed invention overcome or minimize some or all of the identified deficiencies of the prior art, as will become evident to those of ordinary skill in the art after a study of the information presented in this document.

Disclosed herein is a lever assembly for an optical scope having a mounting surface, a mounting hole, and one or more windage, elevation, and/or parallax turrets with indicia thereon. The lever assembly includes a generally triangular lever member which defines a large central opening or window through which a user can easily view turret indicia along a sightline parallel to an axis of the optical scope when the lever assembly is secured to the scope. The lever member includes a base portion adapted to engage the mounting surface of the optical scope, which can be a portion of a magnification adjustment ring. A mounting member can extend through the base portion of the lever member and into the mounting hole defined in the mounting surface to reliably secure the lever member to the optical scope. The lever assembly of the present invention advantageously provides an unobstructed view of turret indicia during use while simultaneously ensuring that the lever member cannot be inadvertently dislodged from the optical scope.

Accordingly, in one aspect, the invention provides a lever assembly for an optical scope defining a mounting surface, a mounting hole, and indicia, the lever assembly comprising a lever member and a mounting member. The lever member comprises a base portion adapted to engage the mounting surface, and an extension portion extending from the base portion. The mounting member is adapted to secure the base portion to the mounting surface by engaging the mounting hole. The base portion and the extension portion define a lever sightline along which the indicia can be viewed when the lever member is secured to the mounting surface.

In another aspect, the invention provides a lever assembly for an optical scope defining a mounting surface, a mounting hole, and indicia, the lever assembly comprising a lever member and a mounting member. The lever member comprises a base portion comprising a base main wall defining an engaging surface adapted to engage the mounting surface and a base hole extending through the base main wall, and an extension portion comprising at least one extension side wall extending from the base main wall. The mounting member is receivable in the mounting hole through the base hole to secure the lever member to the mounting surface. The base main wall and the at least one extension side wall define a lever opening through which the indicia can be viewed along a lever sightline when the lever member is secured to the mounting surface.

In yet another aspect, the invention provides a lever assembly for an optical scope defining a mounting surface, a mounting hole, and indicia, the lever assembly comprising a lever member and a mounting member. The lever member comprises a base portion comprising a base main wall defining an engaging surface adapted to engage the mounting surface, and an extension portion comprising at least one extension side wall extending from the base main wall such that a lever sightline is defined by the base main wall and the at least one extension side wall. The mounting member is adapted to secure the base main wall to the mounting surface by engaging the mounting hole. The mounting member secures the lever member to the optical scope such that the indicia can be viewed along the lever sightline while the lever member is displaced through a range of movement to adjust the optical scope.

The present invention is of particular significance when used in connection with a rifle scope, and that application of the present invention is described herein in detail. However, the present invention may also have application to other types of optical scopes such as spotting scopes and rangefinders.

Numerous other objects, advantages and features of the present disclosure will be readily apparent to those of skill in the art upon a review of the following drawings and description of a preferred embodiment.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various drawings unless otherwise specified. In the drawings, not all reference numbers are included in each drawing, for the sake of clarity.

DETAILED DESCRIPTION

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention.

Those of ordinary skill in the art will recognize numerous equivalents to the specific apparatus and methods described herein. Such equivalents are considered to be within the scope of this invention and are covered by the claims.

To facilitate the understanding of the embodiments described herein, a number of terms are defined below. The terms defined herein have meanings as commonly understood by a person of ordinary skill in the portions relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

This description and appended claims include the words "below", "above", "over," "under," "side", "top", "bottom", "upper", "lower", "when", "vertical", "horizontal", "upright", etc. to provide an orientation of embodiments of the invention to allow for proper description of example embodiments. The foregoing positional terms refer to the assembly when in the orientation shown in FIG. 1. A person of skill in the art will recognize that the assembly can assume different orientations when in use.

Figure 1:
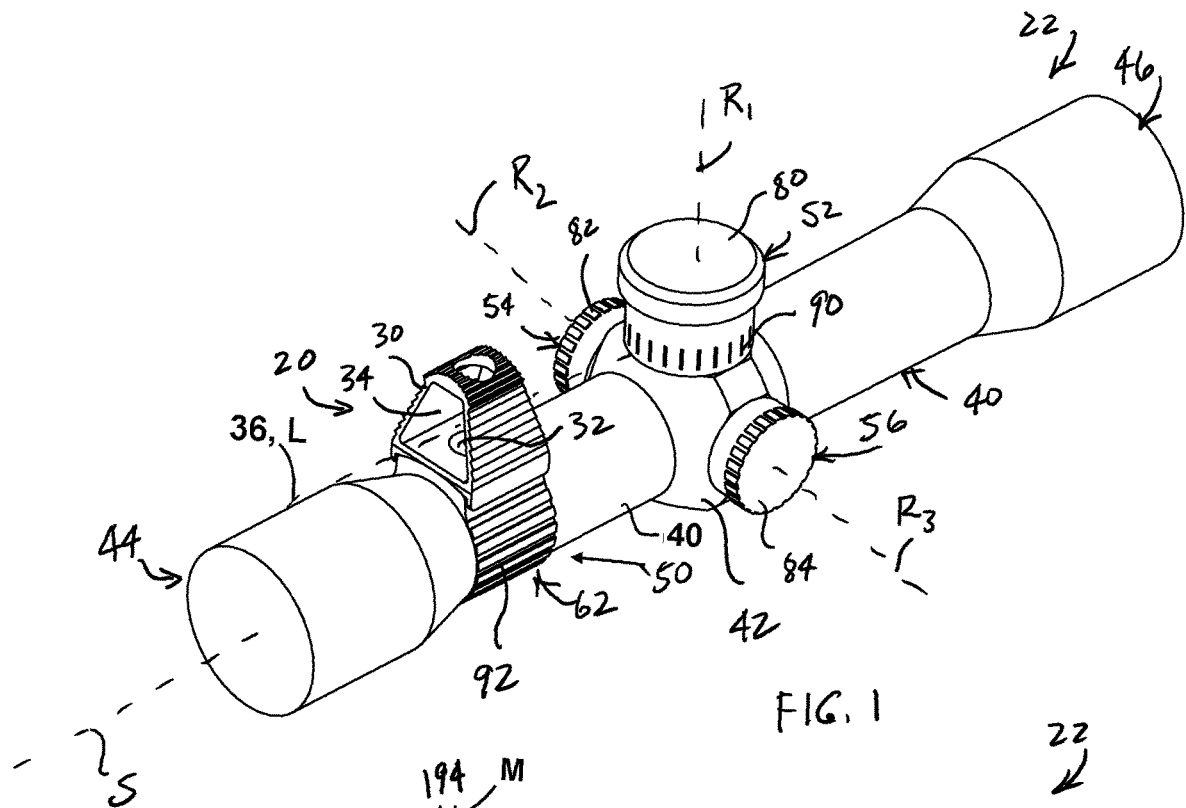
FIG. 1 is a perspective view of an embodiment of a lever assembly of the present invention shown attached to an exemplar rifle scope.

Similarly, an "upright" position as described herein is considered to be the position of the apparatus or assembly components while in proper operation or in a natural resting position as described and shown herein, for example, in FIG. 1. It is also contemplated that embodiments of the invention may be in orientations other than upright without departing from the spirit and scope of the invention as set forth in the appended claims. Further, the terms "above", "below", "over", and "under" mean "having an elevation or vertical height greater or lesser than" and are not intended to imply that one object or component is directly over or under another object or component, unless specifically indicated to the contrary. The term "when" is used to specify orientation for relative positions of components, not as a temporal limitation of the claims or apparatus described and claimed herein unless otherwise specified.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states.

All combinations of method or process steps as used herein can be performed in any order, unless otherwise specified or clearly implied to the contrary by the context in which the referenced combination is made.

The methods and devices disclosed herein, including components thereof, can comprise, consist of, or consist essentially of the essential elements and limitations of the embodiments described herein, as well as any additional or optional components or limitations described herein or otherwise useful.

Figure 2:
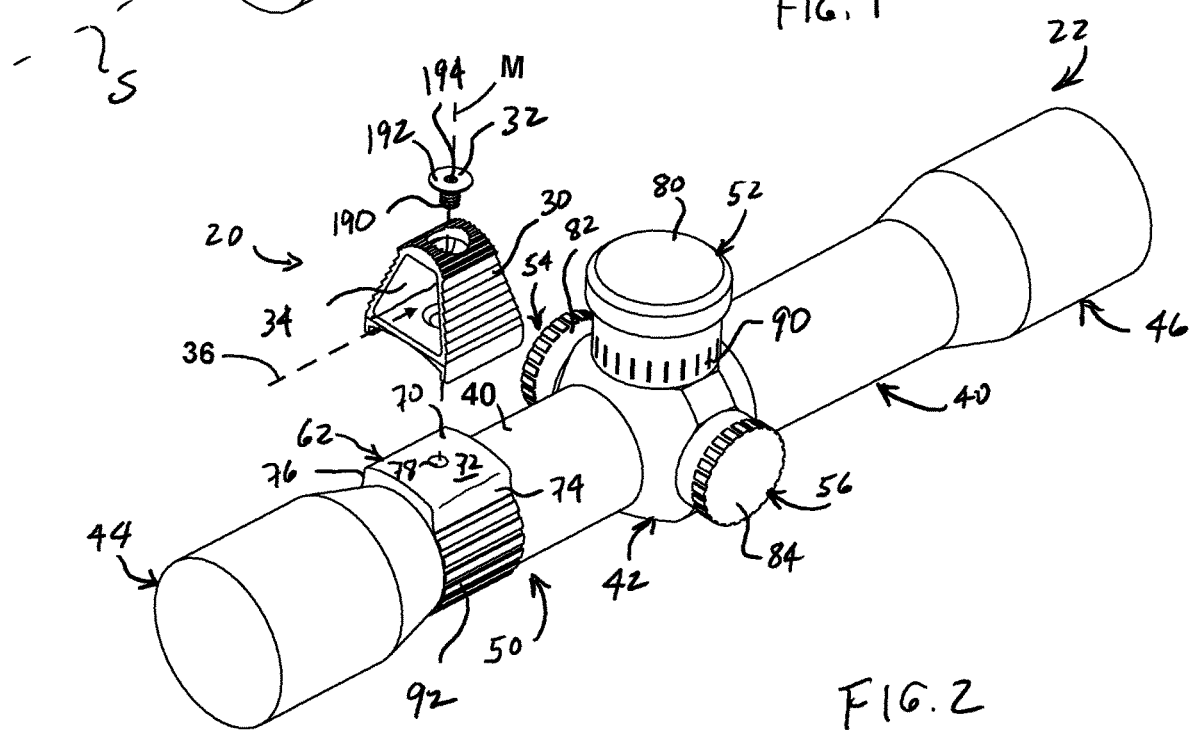
FIG. 2 is a partially exploded perspective view of the objects of FIG. 1.
Figure 3:
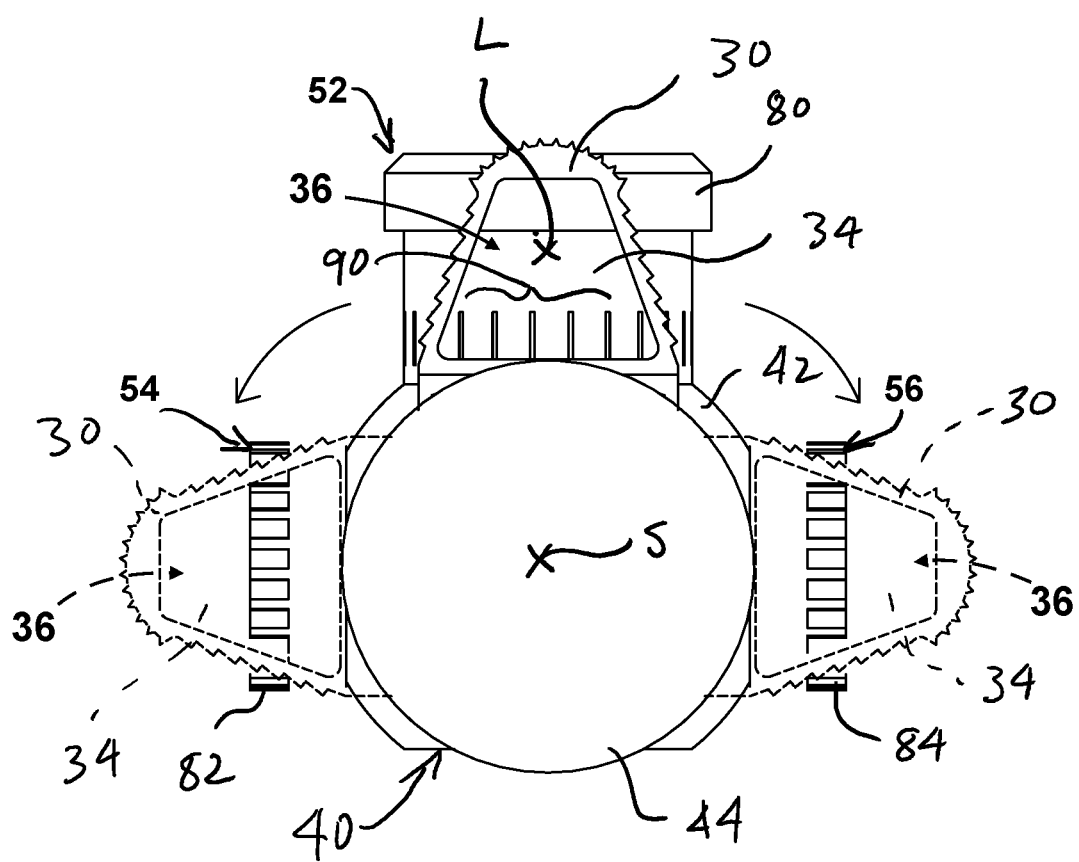
FIG. 3 is an elevational view of the of the objects of FIG. 1 showing adjustment of the rifle scope as facilitated by the lever assembly.
Figure 4:
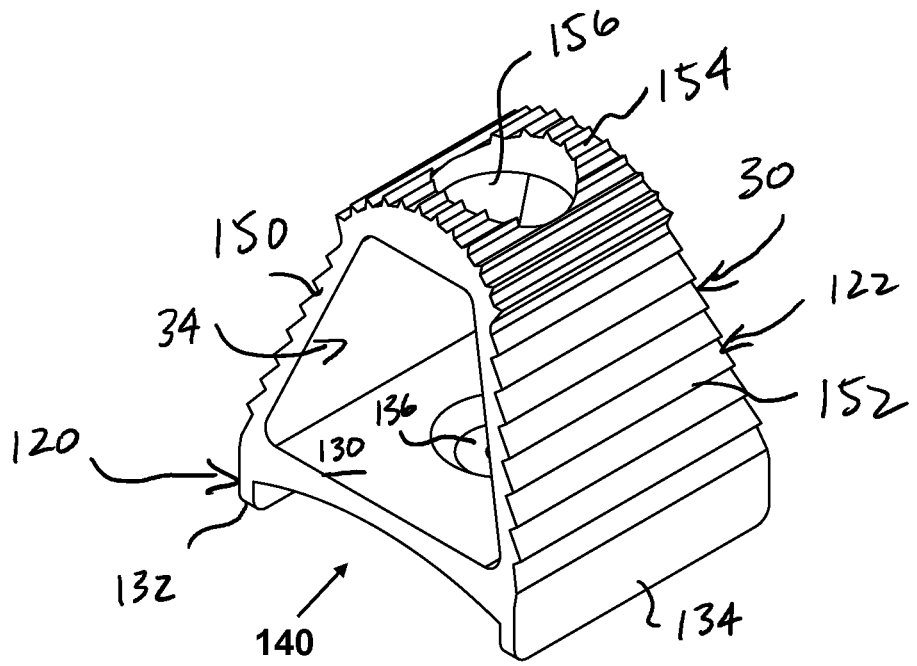
FIG. 4 is an isometric view of the lever member of the lever assembly of FIG. 1.
Figure 5:
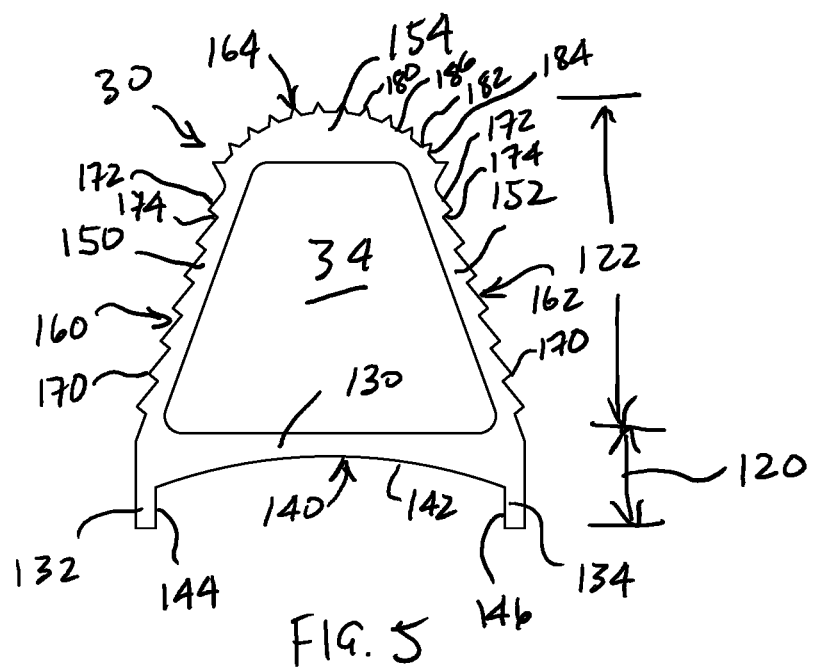
FIG. 5 is a first end elevational view of the lever member of FIG. 4, with the opposite second end elevation view being identical.
Figure 6:
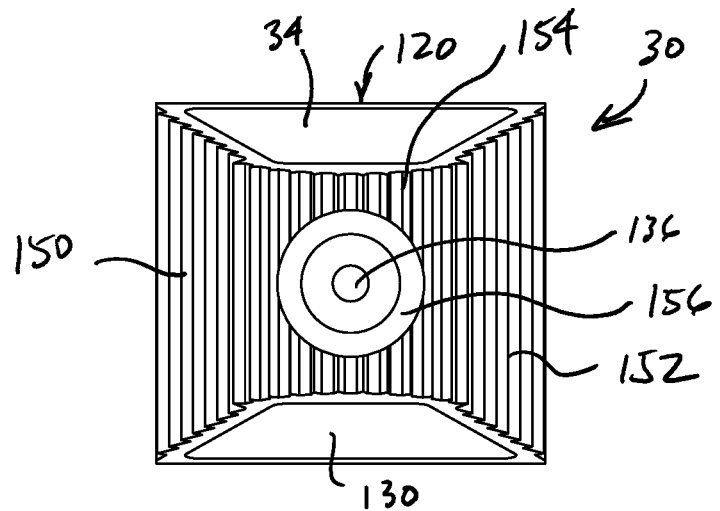
FIG. 6 is a top plan view of the lever member of FIG. 4.
Figure 7:
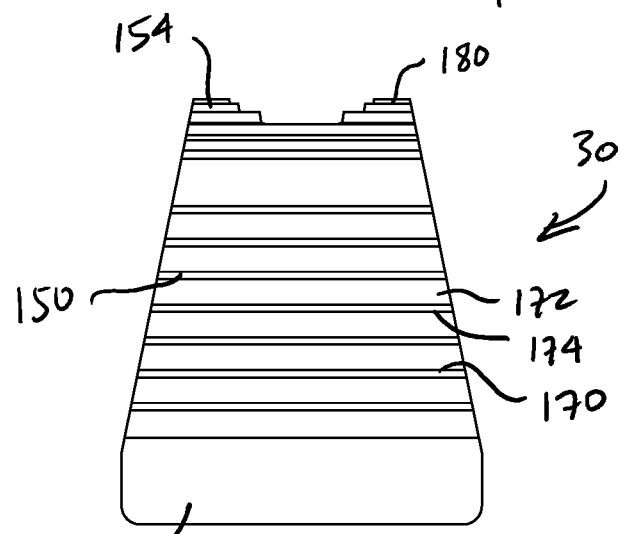
FIG. 7 is a first side elevational view of the lever member of FIG. 4, with the opposite second side elevation view being identical.
Figure 8:
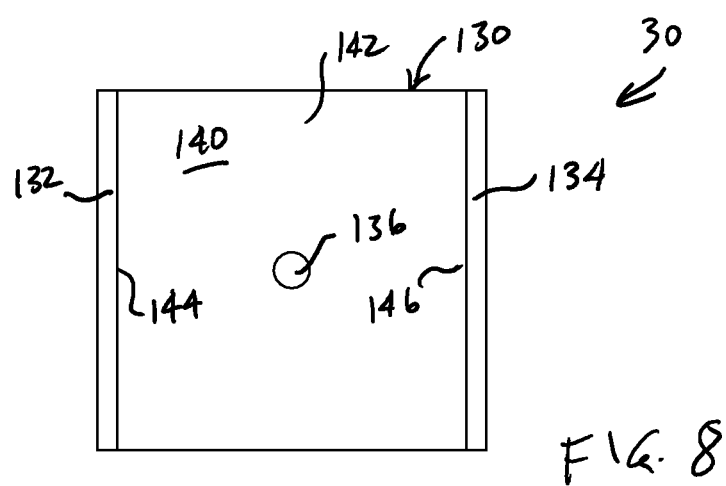
FIG. 8 is a bottom plan view of the lever member of FIG. 4.

Referring initially to FIGS. 1-3, depicted therein is an embodiment of a lever assembly 20 constructed in accordance with, and embodying, the principles of the present invention. The lever assembly 20 is depicted in FIGS. 1 and 3 as attached to an example optical scope 22. The optical scope 22 is a rifle scope which will typically be attached to a firearm such as a rifle (not shown). As shown in FIG. 2, the lever assembly 20 comprises a lever member 30 and a mounting member 32. The lever assembly 20 further defines a lever opening 34 through which extends a lever sightline 36. FIGS. 1 and 3 illustrate that the lever assembly 20 is detachably attached to the optical scope 22 such that a lever axis L associated with the lever sightline 36 is substantially parallel to and spaced from a scope axis S defined by the optical scope 22.

FIG. 3 illustrates that the lever assembly 20 rotates with the portion of the optical scope 22 to which it is detachably attached. In particular, the lever member 30 of the lever assembly 20 may easily be engaged to allow adjustment of the optical scope 22 between a first end position and a second end position and through at least one, a plurality, or a continuum of intermediate positions as shown in FIG. 3. FIG. 3 further illustrates that, with the lever axis L substantially parallel to and spaced from the scope axis S, the lever member 30 is configured to minimize obstruction of the view of portions of the optical scope 22 and any attached accessories along the lever axis L when the optical scope 22 is adjusted. In particular, the lever member 30 is configured such that the lever opening 34 frames at least a portion of the associated lever sightline 36 to allow the user to see portions of the scope and attached accessories beyond the lever member 30 along the lever axis L. As such, the lever opening 34 allows a user to see through the lever member 30 along the lever sightline 36 and thereby view objects situated forward of the lever assembly 20 along the lever axis L. With the foregoing general understand of the invention in mind, the construction and operation of the lever assembly 20 and the optical scope 22 will now be described in further detail.

The optical scope 22 is representative of the types of optical scope with which the lever assembly 20 of the present invention may be used. For example, in some embodiments, the optical scope 22 can be a LEUPOLD® Mark 5 HD rifle scope. The optical scope 22, and any structure (e.g., firearm) on which the optical scope 22 may be supported, does not by itself form a part of the present invention. The optical scope 22 is or may be conventional and will be described herein only to that extent necessary for a complete understanding of the present invention.

The optical scope 22 comprises a scope tube 40 and a turret junction 42. The scope tube 40 includes a first end 44 defining an eye bell with an ocular lens and a second end 46 defining an objective bell with an objective lens. The scope tube 40 further defines the scope axis S. The optical scope 22 further comprises a first adjustment assembly 50, a second adjustment assembly 52, a third adjustment assembly 54, and a fourth adjustment assembly 56.

The first adjustment assembly 50 comprises a magnification adjustment ring 62 supported by the scope tube 40 such that the magnification adjustment ring 62 is arranged between the first end 44 of the scope tube 40 and the scope junction 42. The magnification adjustment ring 62 is supported by the scope tube 40 such that it axially rotates about the scope axis S relative to the scope tube 40. So supported, axial rotation of the magnification adjustment ring 62 relative to the scope tube 40 allows adjustment of what is commonly referred to as the "power" or "zoom" level of the optical scope 22. The magnification adjustment ring 62 defines a mounting surface 70 having a mounting surface main portion 72, a mounting surface first side portion 74, and a mounting surface second side portion 76. A mounting hole 78 is formed in the mounting surface main portion 72. The mounting hole 78 is threaded as will be described in further detail below.

The second adjustment assembly 52 comprises a first adjustment turret 80 defining a first turret axis R1. The third adjustment assembly 54 comprises a second adjustment turret 82 defining a second turret axis R2. The fourth adjustment assembly 56 comprises a third adjustment turret 84 defining a third turret axis R3. In the optical scope 22, the first, second, and third adjustment turrets 80, 82, and 84 extend from the turret junction 42 such that the first, second, and third turret axes R1, R2, and R3, respectively, are substantially orthogonal to the scope axis S. Further, in the optical scope 22, the second and third turret axes R2 and R3 are substantially parallel and substantially aligned and are substantially orthogonal to the first turret axis R1. The first, second, and third adjustment turrets 80, 82, and 84 extend out from the turret junction 42 such that the adjustment turrets 80, 82, and 84 may easily be rotated to adjust the optical scope 22 for factors such as elevation, windage, and parallax. At least one and typically all of the adjustment turrets 80, 82, and 84 are associated with indicia 90.

Turning now to FIGS. 2 and 4-8, the lever assembly 20 will now be described in detail. As perhaps best shown in FIGS. 4-5, the lever member 30 comprises a base portion 120 and an extension portion 122. The base portion 120 is adapted to be secured to the mounting surface 70 defined by the magnification adjustment ring 62. The extension portion 122 is adapted to be manually gripped or otherwise engaged to facilitate axial rotation of the magnification adjustment ring 62 when the lever member 30 is secured to the mounting surface 70. The lever opening 34 is generally triangular in cross-section and is surrounded on one side by the base portion 120 and on two sides by the extension portion 122.

The base portion 120 comprises a base main wall 130, a base first side wall 132, a base second side wall 134. A base hole 136 is formed in the base main wall 130. The base hole 136 is an unthreaded through hole. The base main wall 130 and base first and second side walls 132 and 134 define an engaging surface 140 having an engaging surface main portion 142, an engaging surface first side portion 144, and an engaging surface second side portion 146. The base main wall 130 defines the engaging surface main portion 142, while the base first side wall 132 and base second side wall 134 define the engaging surface first side portion 144 and engaging surface second side portion 146, respectively.

The extension portion 122 comprises an extension first side wall 150, an extension second side wall 152, and an extension distal wall 154. The extension distal wall 154 defines an extension wall hole 156. The extension wall hole 156 is an unthreaded through hole. The extension first side wall 150 defines a first textured wall surface 160. The extension second side wall 152 defines a second textured wall surface 162. The extension distal wall 154 defines a distal textured wall surface 164. The first and second textured wall surfaces 160 and 162 are defined by ridges 170 formed by first ridge surfaces 172 and second ridge surfaces 174. The ridge surfaces 172 and 174 are angled with respect to each and substantially parallel to the lever axis L.

The distal textured wall surface 164 is formed by projections 180 defined by first and second projection surfaces 182 and 184, and an interstitial surface 186 is arranged between each of the projections 180. The projection surfaces 182 and 184 are angled with respect to each and substantially parallel to the lever axis L. The first, second, and third textured wall surfaces 160, 162, and 164 facilitate gripping of the extension portion 122 when displacing the lever member 30 to rotate the magnification adjustment ring 62 about the scope axis S. Other configurations of the first, second, and third textured wall surfaces 160, 162, and 164 may be used to facilitate gripping of the extension portion 122.

In the embodiment of the lever assembly 20 depicted in the drawings, the lever member 30 extends around the entire lever opening 34. However, the lever member 30 need not extend around the entire lever opening 34. For example, the base member 30 can comprise only one of the extension side walls 150 or 152. In this case, the sightline 36 would be defined by the base portion 120, one of the extension side walls 150 or 152, and the extension distal wall 154. In yet another example, the extension distal wall 154 may also be eliminated. In this example, the lever member 30 may be engaged by the user using only one of the extension walls 150 or 152. In each embodiment, the lever opening 34 allows a user to see through the lever member 30 along the lever axis L. This in turn affords the user an unobstructed view of indicia 90 on the adjustment turrets 80, 82, and 84, as well as any accessories such as bubble levels, range finders, and the like, that may be attached to the optical scope forward of the lever assembly 20 and along the lever sightline 36.

The mounting member 32 can be a screw comprising a threaded shaft 190 and a screw head 192. A drive cavity 194 can be formed in the screw head 192. The threaded shaft 190 is adapted to engage the mounting hole 78 in the magnification adjustment ring 62 and is sized and dimensioned to pass through the base hole 136. The screw head 192 is sized and dimensioned to engage the base main wall 130 around the base hole 136. The mounting member 32 can be arranged for engagement with the mounting hole 78 by manually inserting the mounting member 32 through the lever opening 34 and positioning the end of the threaded shaft 190 opposite the screw head 192 in the base hole 136.

However, in some embodiments, the threaded shaft 190 and the screw head 192 can both be sized and dimensioned to pass through the extension wall hole 156 so that the end of the threaded shaft 190 opposite the screw head 192 can be manually inserted directly into the mounting hole 78 through both base hole 136 and the extension wall hole 156. In this alternate embodiment, the screw head 192 remains sized and dimensioned to engage the base main wall 130 around the base hole 136.

The lever assembly 20 can be assembled and attached to the optical scope 22 as follows. The engaging surface 140 of the lever member 30 is arranged relative to the mounting surface 70 of the magnification adjustment ring 62 such that the mounting surface main, first side, and second side portion 72, 74, and 76 engage the engaging surface main, first side, and second side portions 142, 144, and 146, respectively, and the base hole 136 in the base main wall 130 is aligned with the mounting hole 78 in the mounting surface 70. So arranged, the base first and second side walls 132 and 134 inhibit rotation of the lever member 30 about a mounting axis M defined by the aligned mounting hole 78 and base hole 136.

The mounting member 32 is then arranged such that the threaded shaft 190 extends through the base hole 136 and engages the mounting hole 78. Axial rotation of the mounting member 32, such as by using a tool (not shown) to engage the drive cavity 194, causes the threaded shaft 190 to engage the threaded mounting hole 78 to displace the screw head 192 towards the base main wall 130. The tool may be extended through the extension wall hole 156 to facilitate engagement of the tool with the drive cavity 194. When mounting member 32 is tightened such that the screw head 192 engages the base main wall 130, movement of the lever member 30 along the mounting axis M relative to the magnification adjustment ring 62 is substantially prevented. The lever member 30 is thus detachably attached to the magnification adjustment ring 62 after the mounting member 32 is tightened as described above. The lever member 30 may be detached from the magnification adjustment ring 62 by removing the mounting member 32 and displacing the lever member 30 away from the magnification adjustment ring 62 along the mounting axis M.

With the lever member 30 detachably attached to the magnification adjustment ring 62 by the mounting member 32, displacement of the lever member 30 as shown by the arrows in FIG. 3 facilitates axial rotation of the magnification adjustment ring 62 about the scope axis S. In particular, the user may apply finger pressure to one, two, or all three of the textured wall surfaces 160, 162, and 164. Because the textured wall surfaces 160, 162, and 164 are all spaced further from the scope axis S than the mounting surface 70 of the magnification adjustment ring 62, the lever member 30 provides a mechanical advantage that reduces the amount of finger pressure required to cause axial rotation of the magnification adjustment ring 62. Further, because the extension portion 122 is formed by first and second extension side walls that are relatively thin and spaced from each other to define lever opening 34 and sightline 36, the extension portion 122 only minimally obstructs the user's view of the indicia 90 formed on any of the first, second, and third adjustment turrets 80, 82, and 84 as the magnification adjustment ring 62 is rotated relative to the scope tube 40 as shown in FIG. 3. This expanded field of view through the lever member 30 allows a user to quickly and easily locate and manipulate any adjustment turret or scope accessory lying along the lever axis L while minimizing displacement of the user's eye from the eye piece of the optical scope. This, in turn, facilitates more rapid adjustment and aiming of the optical scope, and thus delivery of accurate fire in both sporting and tactical applications.

Although embodiments of the present invention have been described in detail, it will be understood by those skilled in the art that various modifications can be made therein without departing from the spirit and scope of the invention as set forth in the appended claims. For example, alternate embodiments of a lever assembly can be constructed in accordance with the principles of the invention disclosed herein to detachably attached to optical scopes which define a mounting surface having a different configuration from that of the optical scope depicted in the drawings. It is also contemplated that embodiments of the present invention could employ two or more mounting members, including one or more mounting members having a different configuration from that shown in the drawings.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention, it is not intended that such references be construed as limitations upon the scope of this invention except as set forth in the following claims.

What is claimed is:

1. A lever assembly for an optical scope defining a mounting surface, a mounting hole, and indicia, the lever assembly comprising:
   a lever member comprising:
      a base portion adapted to engage the mounting surface, and an extension portion extending from the base portion; and
      a mounting member adapted to secure the base portion to the mounting surface by engaging the mounting hole;
   wherein the base portion and the extension portion define a lever sightline along which the indicia can be viewed when the lever member is secured to the mounting surface.

2. The lever assembly of claim 1, wherein the base portion and the extension portion define a lever opening which at least partially frames the lever sightline.

3. The lever assembly of claim 1, wherein the base portion and the extension portion define a lever opening through which the lever sightline extends.

4. The lever assembly of claim 3, wherein the lever opening allows the indicia to be viewed through the lever member.

5. The lever assembly of claim 1, wherein the base portion comprises a base main wall defining an engaging surface adapted to engage the mounting surface.

6. The lever assembly of claim 5, wherein:
   the base main wall includes a base hole defined therethrough; and
   the mounting member is receivable in the mounting hole through the base hole to secure the lever member to the mounting surface.

7. The lever assembly of claim 5, wherein:
   the mounting surface includes a mounting surface main portion and at least one mounting surface side portion;
   the engaging surface of the base main wall is adapted to engage the mounting surface main portion;
   the base portion further comprises at least one base side wall extending from the base main wall;
   the at least one base side wall defines an engaging surface adapted to engage the at least one mounting surface side portion; and
   the at least one base side wall inhibits rotation of the lever member about the mounting member when the engaging surface of the at least one base side wall is engaged with the at least one mounting surface side portion.

8. The lever assembly of claim 5, wherein:
   the extension portion comprises at least one extension side wall extending from the base main wall such that the lever sightline is defined by the base main wall and the at least one extension side wall.

9. The lever assembly of claim 8, wherein:
   the at least one extension side wall is two extension side walls;
   the two extension side walls are spaced apart such that the lever sightline is defined between the extension side walls.

10. The lever assembly of claim 8, wherein:
    the extension portion comprises an extension distal wall extending from the at least one extension side wall; and
    the extension distal wall is spaced from the base main wall by the at least one extension side wall such that the lever sightline is defined by the base main wall, the at least one extension side wall, and the extension distal wall.

11. The lever assembly of claim 9, wherein:
    the extension portion comprises an extension distal wall extending between the two extension side walls such that the lever sightline is defined by the base main wall, the two extension side walls, and the extension distal wall.

12. The lever assembly of claim 10, wherein the distal extension wall defines an extension wall hole through which a tool is receivable to engage the mounting member.

13. A lever assembly for an optical scope defining a mounting surface, a mounting hole, and indicia, the lever assembly comprising:
    a lever member comprising:
       a base portion comprising a base main wall defining an engaging surface adapted to engage the mounting surface and a base hole extending through the base main wall, and
       an extension portion comprising at least one extension side wall extending from the base main wall; and
       a mounting member receivable in the mounting hole through the base hole to secure the lever member to the mounting surface;
    wherein the base main wall and the at least one extension side wall define a lever opening through which the indicia can be viewed along a lever sightline when the lever member is secured to the mounting surface.

14. The lever assembly of claim 13, wherein:
    the mounting surface includes a mounting surface main portion and at least one mounting surface side portion;
    the engaging surface of the base main wall is adapted to engage the mounting surface main portion;
    the base portion further comprises at least one base side wall extending from the base main wall;
    the at least one base side wall defines an engaging surface adapted to engage the at least one mounting surface side portion; and
    the at least one base side wall inhibits rotation of the lever member about the mounting member when the mounting member is received in the mounting hole through the base hole.

15. The lever assembly of claim 13, wherein:
    the at least one extension side wall is two extension side walls;
    the two extension side walls extend from opposite sides of the base main wall such that the lever opening is defined between the extension side walls.

16. The lever assembly of claim 13, wherein:
    the extension portion comprises an extension distal wall extending from the at least one extension side wall; and
    the extension distal wall is spaced from the base main wall by the at least one extension side wall such that the lever opening is defined by the base main wall, the at least one extension side wall, and the extension distal wall.

17. The lever assembly of claim 15, wherein:
    the extension portion comprises an extension distal wall extending between the two extension side walls such that the lever opening is defined by the base main wall, the two extension side walls, and the extension distal wall.

18. A lever assembly for an optical scope defining a mounting surface, a mounting hole, and indicia, the lever assembly comprising:

a lever member comprising:
- a base portion comprising a base main wall defining an engaging surface adapted to engage the mounting surface, and
- an extension portion comprising at least one extension side wall extending from the base main wall such that a lever sightline is defined by the base main wall and the at least one extension side wall; and
- a mounting member adapted to secure the base main wall to the mounting surface by engaging the mounting hole;

wherein the mounting member secures the lever member to the optical scope such that the indicia can be viewed along the lever sightline while the lever member is displaced through a range of movement to adjust the optical scope.

19. The lever assembly of claim 18, wherein:

the mounting surface includes a mounting surface main portion and two mounting surface side portions;

the engaging surface of the base main wall is adapted to engage the mounting surface main portion;

the base portion further comprises two base side walls extending from the base main wall;

each of the two base side walls defines an engaging surface adapted to engage one of the respective mounting surface side portions; and the two base side walls inhibit rotation of the lever member about the mounting member when the lever member is secured to the optical scope.

20. The lever assembly of claim 18, wherein:

the at least one extension side wall is two extension side walls;

the two extension side walls extend from opposite sides of the base main wall; and the extension portion comprises an extension distal wall extending between the two extension side walls above the base main wall such that the lever sightline is defined by the base main wall, the two extension side walls, and the extension distal wall.

* * * * *